United States Patent
Argue et al.

(10) Patent No.: US 9,898,746 B2
(45) Date of Patent: Feb. 20, 2018

(54) LOCATING A SPECIFIC PRODUCT WITHIN A RETAIL ENVIRONMENT IN FURTHERANCE OF A COMPARISON OF PRODUCT INFORMATION BASED ON PRODUCT CODES

(75) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 651 days.

(21) Appl. No.: 13/549,281

(22) Filed: Jul. 13, 2012

(65) Prior Publication Data

US 2014/0019200 A1    Jan. 16, 2014

(51) Int. Cl.
*G06Q 30/02* (2012.01)

(52) U.S. Cl.
CPC .................................. *G06Q 30/02* (2013.01)

(58) Field of Classification Search
CPC ......... G06Q 50/06; G06Q 10/02; G06Q 10/20
USPC ........................ 705/26.64, 26.7, 26.8, 20, 35
See application file for complete search history.

(56) References Cited

U.S. PATENT DOCUMENTS

| | | | |
|---|---|---|---|
| 5,887,271 A * | 3/1999 | Powell | 705/14.1 |
| 6,471,125 B1 * | 10/2002 | Addy | 235/385 |
| 6,587,835 B1 | 7/2003 | Treyz | |
| 7,346,520 B2 | 3/2008 | Etzioni | |
| 7,406,437 B2 * | 7/2008 | Goodwin, III | 705/14.36 |
| 7,580,699 B1 | 8/2009 | Shaw | |
| 7,668,754 B1 * | 2/2010 | Bridgelall | G06Q 30/06 705/26.9 |
| 7,949,714 B1 | 5/2011 | Burnim | |
| 8,150,739 B1 | 4/2012 | Marggraff | |
| 2005/0256782 A1 | 11/2005 | Sands | |
| 2006/0036502 A1 | 2/2006 | Farrell | |
| 2006/0163350 A1 * | 7/2006 | Melton | G06K 7/10336 235/435 |
| 2008/0313014 A1 * | 12/2008 | Fell et al. | 705/10 |
| 2009/0012704 A1 * | 1/2009 | Franco et al. | 701/200 |
| 2010/0070343 A1 | 3/2010 | Taira | |
| 2010/0138281 A1 | 6/2010 | Zhang | |
| 2012/0123674 A1 * | 5/2012 | Perks et al. | 701/426 |

OTHER PUBLICATIONS http://web.archive.org/web/20000526203753/http://www.umass.edu/nibble/infofile/unitpric.html Unit Price (www.umass.edu May 26, 2000).*
Frederic Lardinois, Location-Based Services Move into the Supermarket: Pancake Mix on Aisle 6, ReadWrite Aug. 25, 2010.*
Point Inside Blog Aug. 25, 2010-May 1, 2012.*
Point Inside website (http://pointinside.com/solutions/largeretailers/), Jul. 8, 2011.*
The iPhone Mom, Apples 2 Oranges, Sep. 3, 2009.*

* cited by examiner

Primary Examiner — Nadja Chong Cruz
(74) Attorney, Agent, or Firm — Bryan Cave LLP

(57) ABSTRACT

A method for comparison of product information based on product codes to determine the cost per unit weight per product and hereby determine the cheapest product per unit weight is disclosed herein. The method further comprises of displaying the location information of the cheapest product within the retail store and providing navigational information for enabling the consumer to access the product easily.

11 Claims, 8 Drawing Sheets

LOCATING A SPECIFIC PRODUCT WITHIN A RETAIL ENVIRONMENT IN FURTHERANCE OF A COMPARISON OF PRODUCT INFORMATION BASED ON PRODUCT CODES

BACKGROUND OF THE INVENTION

A product generally comprises at least one label, where the label comprises information about the product such as name of the product, cost of the product, weight of the product and so on. Such labels may contain the information in an alphanumeric format or in the form of a machine-readable code (wherein the code may be a bar code, QR code or any other suitable format). Therefore, when a consumer goes to purchase a product from a retail store, the consumer has to peruse these labels before being able to make an informed decision on his purchase. Consider a scenario where a consumer wants to buy a product, but has to make a selection from two or more products based on cost per weight unit (where the products may be from different sources or from the same sources, but of different sizes). The consumer has to read the labels and perform a mental exercise for estimating the cost per unit weight of the product, before making a decision.

In light of the above, some jurisdictions have mandated that the cost per unit weight has to be published on the product label. This entails that the retailer modify the existing labels for including this information, which puts an additional burden on the retailer.

Further, the consumer may not necessarily be co-located with the product that is of interest to him and may not be aware of the location of the product within the retail store. Currently, the consumer has to rely on asking staff in the retail store for directions or signs present in aisles or sections within the retail store. However, these directions are limited to directing the consumer to a specific aisle or section; the consumer has to further search within the aisle or section for the product of interest to him.

Accordingly, what is needed is an apparatus and method for enabling the consumer to easily access the cost per unit weight of products and easily locate the corresponding products within a retail store, without putting an additional burden on the retailer or any other component in the product supply chain.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
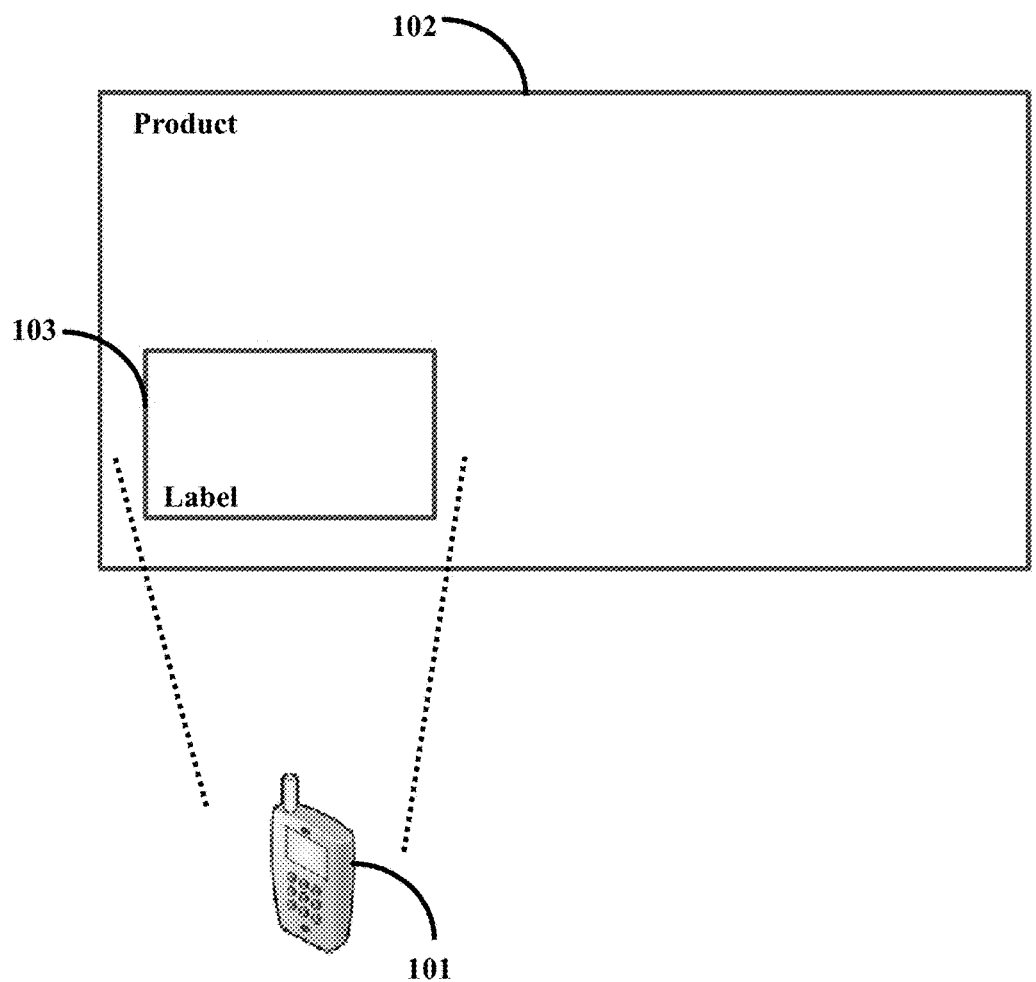
FIG. 1 depicts a handheld device scanning a label present on a product, according to embodiments as disclosed herein.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for enabling the consumer to easily access the cost per unit weight of products.

Herein, the consumer may scan a first label on a first product using a handheld device. In certain embodiments, the label may contain alphanumeric data, wherein the data may be a listing of price of the product, weight of the product, expiry date of the product, date of manufacture of the product and so on. In certain embodiments, the label may contain at least one machine-readable code, wherein the machine-readable code may be a two-dimensional barcode (e.g., a linear barcode, a Quick Response (QR) Code, a DataMatrix code). In selected embodiments, a machine-readable code may encode a product identification number uniquely identifying the product, cost of the product, price of the product, weight of the product and so on. In other embodiments herein, the label may be wireless proximity based tag (such as a Radio Frequency Identification (RFID) tag). The data present on the label may vary between different embodiments and different purposes or goals of the label.

The handheld device, as disclosed herein, may be a mobile phone, a Personal Digital Assistant (PDA), a tablet, a portable multimedia player, a handheld computing device or a dedicated scanning device. The scanned first label may be compared with a second label to obtain a comparison of the price per unit weight of the product with the scanned label with the price per unit weight of the second product, wherein the second label belongs to the second product. In certain embodiments herein, the second label may be scanned by the handheld device in real time. In other embodiments herein, the second label may be scanned by the device at a previous point in time and stored in a suitable location, wherein the second label may be retrieved from the location as required. The handheld device further gives an indication to the consumer of the cheaper product per unit weight, on basis of the comparison between the price per unit weights as indicated by the first label and the second label.

Embodiments herein discuss comparison of first label and a second label merely for the purposes of illustration, but it may be obvious to a person to extend the comparison to any number of labels, wherein the labels may be scanned in real time or retrieved from a storage location.

The consumer if further provided directions to the specific location within the retail store, where the cheapest product is located. These directions may be in the form of a movable map, directing the consumer to the product. These directions may be in form of an audio, directing the consumer. The handheld device may use a suitable location and navigation means, wherein the means may be at least one of Global Positioning System (GPS), a short range communication means (such as Bluetooth, Zigbee and so on), a wireless network, a cellular communication network and so on.

In general, the purpose of various embodiments disclosed herein may be to benefit, economically or otherwise, a consumer, an entity (e.g., an entity issuing the receipt, the retailing entity, the manufacturing/packaging entity), or some combination thereof.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Further, the computer programming cod may be written using a development tool available for developing apps, where apps refer to software applications that are used in personal devices such as smart phones and other devices. The program code may execute entirely on the handheld device, a remote computing system or server (herein after referred to as the computing system) or partly on the computing system and the handheld device. In the latter scenario, the computing system may be connected to the handheld device through a suitable type of communication network, such as a cellular communication network, a wireless communication network and so on.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 depicts a handheld device 101 scanning a label 103 present on a product 102. The label 103 may be an alpha-numeric data based label, a machine-readable data based label or a RFID based label. The handheld device 101 may be any suitable device capable of reading the label 103. Examples of the handheld device 101 may be a mobile phone, a PDA, a tablet, a handheld scanner or a dedicated scanning device. The handheld device 101 may comprise of more than one type of scanner, wherein the scanner used for reading a particular label depends on the type of label being scanned. The handheld device 101 comprises an application, wherein the application performs the functions as detailed herein. The handheld device 101 may be brought by the consumer into the retail location. In certain embodiments, the handheld device 101 may be provided to the consumer by the retailer for use at the retail location.

Consider an example, where the label 103 is an alphanumeric data based label, the handheld device 101 comprises a camera to capture to data printed on the label 103. In a second example, the handheld device 101 comprises of a scanner (such as a camera, laser scanner and so on) which the consumer uses to scan the label containing a machine-readable code (such as a barcode, QR code and so on). In a third example, the handheld device 101 uses a RFID reader to read the RFID label 103 present on the product 102.

The handheld device 101 may scan the label using an app stored within the handheld device 101 upon being initiated by a user. The app may be an application present on the phone, wherein the app may be initiated by the consumer using a suitable interface.

In an embodiment herein, the app on the handheld device 101 compares the scanned label with at least one other label, wherein the other labels may be scanned at a later point by the handheld device 101.

In another embodiment herein, the app on the handheld device 101 compares the scanned label with at least one other label, wherein the other labels may be stored in a memory associated with the handheld device 101.

In another embodiment herein, the app on the handheld device 101 compares the scanned label with at least one other label, wherein at least one of the other labels may be stored in a memory associated with the handheld device 101 and other labels may be scanned at a later point by the handheld device 101.

The app on the handheld device 101 extracts the required information from the labels. The extracted information may comprise of cost of the product, weight of the product and so on. The units of the weight of the product may be as per the standards followed. The app computes the cost per unit weight for each of the products to whom the label belongs. The app further compares the cost per unit weight for all of the products to whom the label belongs and determines the cheapest product (wherein the cheapest product is the product with lowest cost per unit weight).

The handheld device 101 may further display the cheapest product to the consumer. In certain embodiments herein, the handheld device 101 may display a list comprising of all compared products, wherein the list may be arranged in ascending order from the cheapest product to the most expensive product. The consumer may also be offered the option of re-ordering the list, as per his preferences.

The app may further display the location of the cheapest product within the retail store. The app may display the location in the form of a map stating the aisle/section where the product is located and the exact location of the product within the aisle/section. The app may also display shelf height, aisle/section, or other more detailed location information. The display may be in the form of a map of the layout of the retail store, which may be a two dimensional map or a three dimensional map. The app may fetch the information to be displayed from a memory store within the handheld device 101. In another embodiment herein, the app may fetch the information to be displayed from an external source. The external source may be at least one of a server belonging to the retail store, an external database and so on.

Further, the app may provide directions to enable the consumer to reach the location of the product from the current location of the consumer. The current location of the consumer may be inside the retail store or outside the retail store. The directions may be provided as a real time navigation model, where the app displays a map in the form of a line-based directions using arrows to indicate the direction the consumer has to move, from the current location of the consumer to the location of the product. The directions may be updated in a continuous manner, based on the current location and direction of movement of the consumer. In an embodiment herein, the app comprises of an audio guide for providing directions to the consumer. The audio guide may provide instructions such as "proceed straight for 10 meters", "take a right after 5 meters", "the product is located 10 steps on the middle shelf to your right" and so on. The app may also provide options for the consumer to select, such as the shortest route, the route which has the least crowds present and so on.

In another embodiment herein, the app may display the locations of all the products, which are displayed in a list form to the consumer. The products may be tagged with labels such as A, B and so on, with the locations where the corresponding products are located may be tagged with the corresponding labels. The app enables the consumer to select one or more products, with the consumer being displayed the locations of the products within the retail store. In an embodiment herein, the products may be located in various retail stores. The app may further provide directions to the consumer to navigate from one product to another. The app may also provide options for the consumer to select, such as the shortest route between the products, the route which has the least crowds present and so on.

In another embodiment herein, the app may offer the user of filtering the products, where the filtration criteria may comprise of at least one of brand of the product, a range of weights, location of the product and so on.

Figure 2:
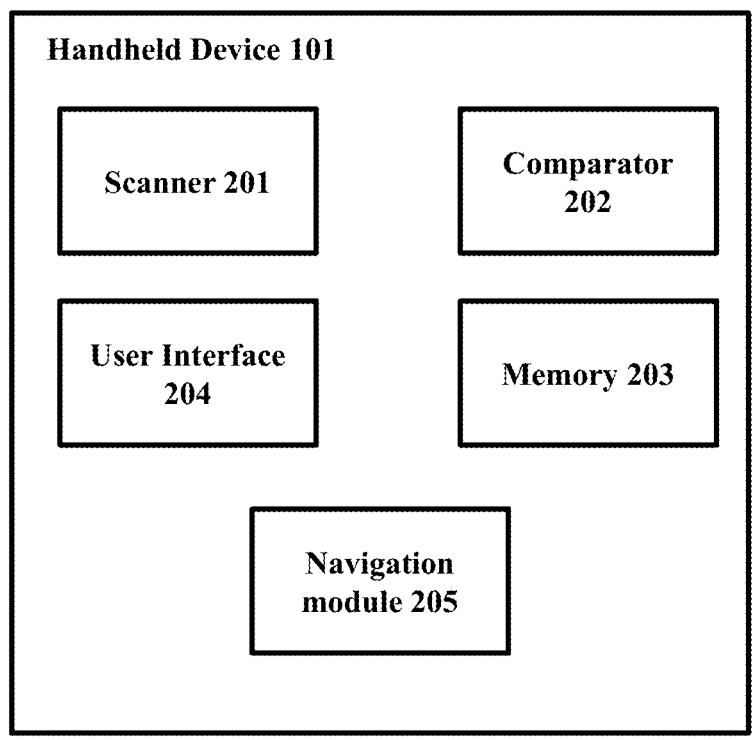
FIG. 2 is a schematic block diagram of a handheld device, according to embodiments as disclosed herein.

Referring to FIG. 2, which depicts a handheld device, according to embodiments as disclosed herein. The handheld device 101, as depicted, comprises of a scanner 201, a comparator 202, a memory 203, a user interface 204 and a navigation module 205, in accordance with the present invention.

The scanner 201 may comprise of at least one type of scanning means. The scanning means may be a camera incorporated into the device, a RFID reader, a barcode reader (such as a laser scanner) and so on.

The comparator 202 may be an app residing on the handheld device 101, wherein the consumer using the user interface 204 may invoke the comparator 202. The user interface 204 may be at least one of a visual display (such as a display screen and so on), a touch based input means (such as a keyboard, a touch screen interface and so on), an audio means (such as a speaker and so on) and so on. The comparator 202, on being invoked, performs a check for the type of label 103 to be scanned. In certain embodiments herein, the check for the type of label 103 to be scanned may be done using a camera present on the handheld device 101, wherein the consumer may be asked to point the camera at the label 103. In other embodiments herein, the comparator 202 asks the consumer to input the type of label 103 to be scanned, wherein the consumer may be asked using the user interface 204. The consumer may be asked to select from a list of labels, which are supported by the handheld device 101. In an alternative, the consumer may be asked to enter the type of label 103 to be scanned, wherein an auto-completion or suggestion feature may be incorporated. Based on the type of label 103, the comparator 202 invokes the specific scanner required to scan the label 103. If more than one type of scanner may be used to scan the label 103, the comparator 202 may check for user preferences for the scanner to be used. the comparator 202 may also check based on the past scanning history, as to which scanner has been used more frequently and which scanner gives better results, in terms of better clarity of scans, time required for scanning and so on. Consider an example, where a barcode on a label has to be scanned. The barcode may be scanned using a camera (as done in mobile devices) or by a dedicated laser scanner (as done at the checkout counters at retail outlets), both of which are present in the handheld device 101. The comparator 202 selects the laser scanner, as the consumer has indicated that he wants to scan the label 103 using the laser scanner.

The comparator 202 invokes the required scanner 201. The consumer may be asked to point the scanning device in the direction of the label 103, using the user interface 204. The consumer may be given directions as to the proper manner in which the handheld device 101 has to be oriented. On detecting that the handheld device 101 has been oriented in the proper direction, the scanner 201 scans the label 103. The handheld device 101 may use a suitable means such as a combination of a camera, an accelerometer and so on to detect the current orientation of the handheld device 101.

On receiving the scanned label, the comparator 202 checks if the consumer wants to scan another label using the user interface 204, before proceeding with the comparison. The comparator 202 may store the scanned label in the memory 203 (wherein the memory 203 may comprise of one or more memory modules). In certain embodiments herein, the memory 201 may be present external to the handheld device 101, wherein the handheld device 101 communicates with the memory 203 using a suitable wireless network.

If the consumer wants to scan another label, then the consumer selects the appropriate selection using the user interface 204. On receiving the input from the consumer, the comparator 202 performs the steps as disclosed above to scan a second label.

If the consumer does not want to scan another label, the comparator 202 may ask the consumer to select at least one label for comparison using the user interface 204. The user interface 204 may offer a list of scanned labels, wherein the consumer may select two or more labels from the list for the comparison. At least one of the labels may have been scanned by the handheld device 101 in real time. In certain embodiments, at least one of the labels may be retrieved from the memory 203.

The comparator 202 extracts the required information from the selected labels. The extracted information may comprise of cost of the product, weight of the product and so on. The comparator 202 computes the cost per unit weight for each of the products to whom the label belongs. The comparator 202 further compares the cost per unit weight for all of the products to whom the label belongs and determines the cheapest product (wherein the cheapest product is the product with lowest cost per unit weight).

In an embodiment herein, the comparator 202 may standardize the unit weights, in case the weights are mentioned in different units. Consider a case where the comparator 202 is comparing two products, wherein the first product mentions that the cost of the product weighing X kilograms is Y, while the second product mentions that the cost of the product weighing A ounces is B. The comparator 202 may standardize the weights as either ounces or kilograms or a third specified unit of weight. Alternately, the comparator 202 may ask the consumer for his unit weight of preference for standardization.

The comparator 202 may further display the cheapest product to the consumer using the user interface 204. In certain embodiments herein, the user interface 204 may display a list comprising of all compared products, wherein the comparator 202 may arrange the list in ascending order from the cheapest product to the most expensive product. The user interface 204 may also offer the option of re-ordering the list to the consumer, as per his preferences.

The comparator 202 may further display the location of the cheapest product within the retail store using the user interface 204. The comparator 202 may display the location in the form of a map stating the aisle/section where the product is located and the exact location of the product within the aisle/section. The display may be in the form of a map of the layout of the retail store, which may be in a two-dimensional or a three dimensional format. The app may fetch the information to be displayed from the memory 203. In another embodiment herein, the app may fetch the information to be displayed from an external source. The external source may be at least one of a server belonging to the retail store, an external database (such as local government records, photographs taken in the store and available publicly) and so on.

Further, the comparator 202 may provide directions to enable the consumer to reach the location of the product from the current location of the consumer with the assistance of the navigation module 205. The navigation module 205 may use at least one of Global Positioning System (GPS), a wireless network (where the wireless network uses one of a cellular network, a Wi-Fi network, a Bluetooth network or any other suitable network) for detecting the current location of the consumer. The navigation module 205 estimates the directions for the consumer to reach the cheapest product. The navigation module 205 may provide the directions as a real time navigation model, where the user interface 204 displays a map in the form of a line based directions using arrows to indicate the direction the consumer has to move, from the current location of the consumer to the location of the product. The navigation module 205 keeps track of the movement of the consumer (in terms of the current location and direction of movement of the consumer) and updates the directions in a continuous manner. In an embodiment herein, the navigation module 205 further uses an audio guide for providing directions to the consumer. The audio guide may provide instructions such as "proceed straight for 10 meters", "take a right after 5 meters", "the product is located 10 steps on the middle shelf to your right" and so on. The navigation module 205 may also provide options for the consumer to select, such as the shortest route, the route that has the least crowds present and so on.

In another embodiment herein, the comparator 202 may display the locations of all the products on the user interface 204, which are displayed in a list form to the consumer. The comparator 202 may tag the products with labels such as A, B and so on, with the locations in the map, where the corresponding products are located are tagged with the corresponding labels. The comparator 202 enables the consumer to select one or more products, with the consumer being displayed the locations of the products within the retail store. In an embodiment herein, the products may be located in various retail stores. The navigation module 205 may further provide directions to the consumer to navigate from one product to another. The navigation module 205 may also provide options for the consumer to select, such as the shortest route between the products, the route, which has the least crowds, present and so on.

In another embodiment herein, the comparator 202 may offer the user of filtering the products, where the filtration criteria may comprise of at least one of brand of the product, a range of weights, location of the product and so on.

Figure 3:
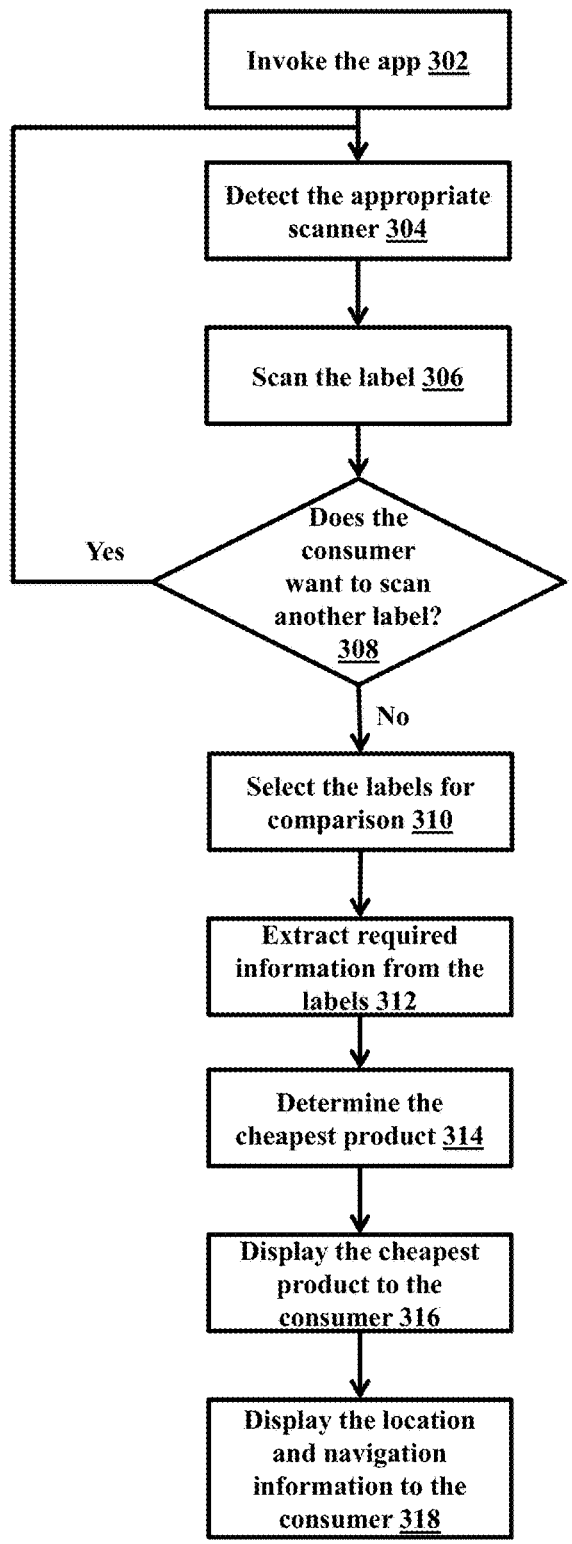
FIG. 3 is a flowchart depicting the process of determining the cheapest product per unit weight and locating the product within the retail store, according to embodiments as disclosed herein.

FIG. 3 is a flowchart depicting the process of determining the cheapest product per unit weight and locating the product within the retail store, according to embodiments as disclosed herein. The consumer invokes 302 the app residing on the handheld device 101. The app, on being invoked, determines 304 the type of label 103 to be scanned. In certain embodiments herein, the check for the type of label 103 to be scanned may be done using a camera present on the handheld device 101, wherein the consumer may be asked to point the camera at the label 103. In other embodiments herein, the app asks the consumer to input the type of label 103 to be scanned. The consumer may be asked to select from a list of labels, which are supported by the handheld device 101. In an alternative, the consumer may be asked to enter the type of label 103 to be scanned, wherein an auto-completion or suggestion feature may be incorporated. If more than one type of scanner may be used to scan the label 103, the app may check for user preferences for the scanner to be used. The app may also check based on the past scanning history, as to which scanner has been used more frequently and which scanner gives better results, in terms of better clarity of scans, time required for scanning and so on. Based on the type of label, the app scans 306 the label 103. The app may ask the consumer to point the scanning device in the direction of the label 103. The consumer may be given directions as to the proper manner in which the handheld device 101 has to be oriented. The handheld device 101 may use a suitable means such as a combination of a camera, an accelerometer and so on to detect the current orientation of the handheld device 101. On receiving the scanned label, the app checks 308 if the consumer wants to scan another label. The app may store the scanned label. If the consumer wants to scan another label, then the app performs the steps as disclosed above to scan a second label. If the consumer does not want to scan another label, the consumer selects 310 at least one label for comparison. The app may offer a list of scanned labels, wherein the consumer may select two or more labels from the list for the comparison. At least one of the labels may have been scanned by the handheld device 101 in real time. In certain embodiments, at least one of the labels may be retrieved from the memory 203. The app extracts 312 the required information from the selected labels. The extracted information may comprise of cost of the product, weight of the product and so on. The app determines 314 the cheapest product (wherein the cheapest product is the product with lowest cost per unit weight) by computing the cost per unit weight for each of the products to whom the label belongs and comparing the cost per unit weight for all of the products to whom the label belongs and determines the cheapest product. The app displays 316 the cheapest product to the consumer. In certain embodiments herein, the app may display a list comprising of all compared products, wherein the app may arrange the list in ascending order from the cheapest product to the most expensive product. The app may also offer the option of re-ordering the list to the consumer, as per his preferences. The app may further display 318 the location of the cheapest product within the retail store. The app may display the location in the form of a map stating the aisle/section where the product is located and the exact location of the product within the aisle/section. The display may be in the form of a map of the layout of the retail store, which may be a two dimensional map or a three dimensional map. Further, the app may provide directions to enable the consumer to reach the location of the product from the current location of the consumer. The directions may be provided as a real time navigation model, where the app displays a map in the form of a line-based directions using arrows to indicate the direction the consumer has to move, from the current location of the consumer to the location of the product. The directions may be updated in a continuous manner, based on the current location and direction of movement of the consumer. In an embodiment herein, the app comprises of an audio guide for providing directions to the consumer.

Figure 4:
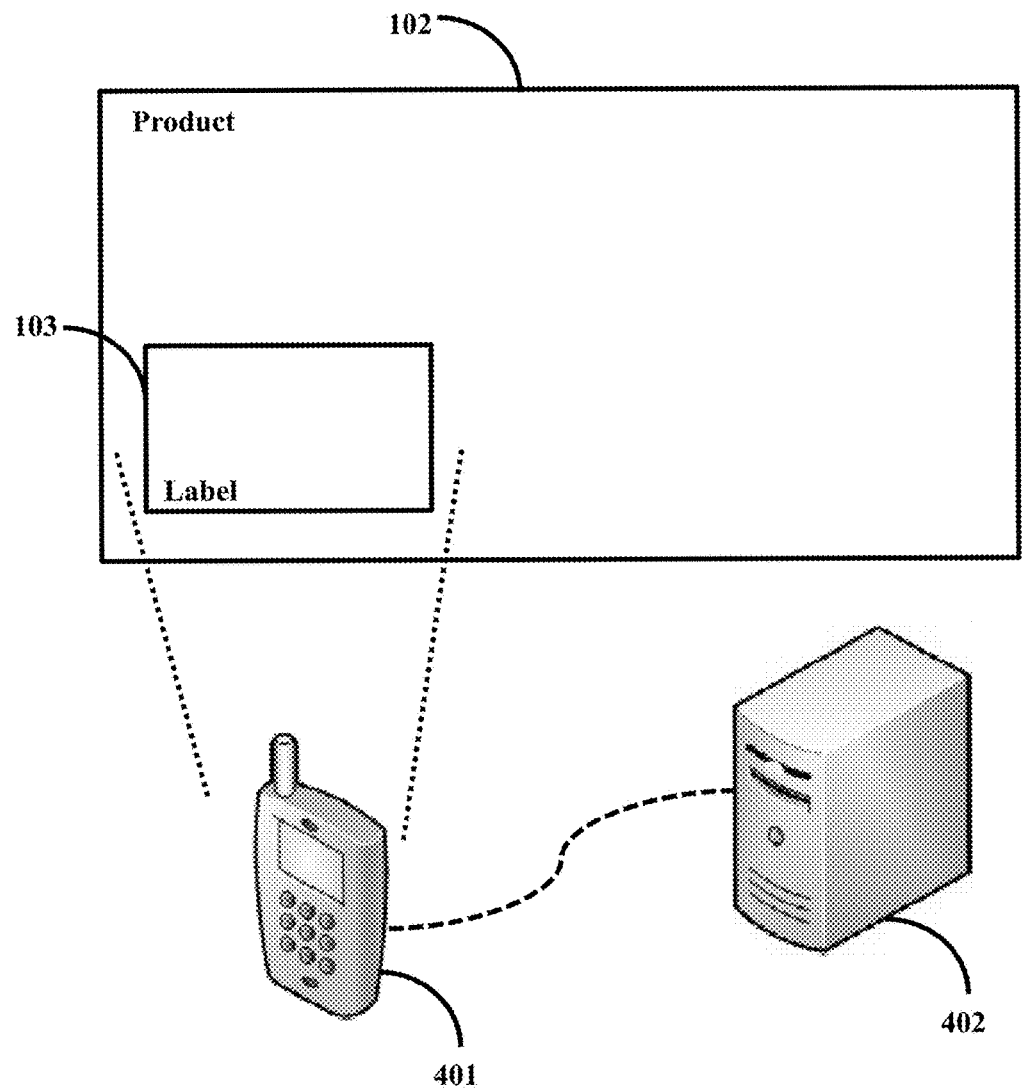
FIG. 4 depicts a handheld device scanning a label present on a product, wherein the handheld device is connected to a computing system, according to embodiments as disclosed herein.

FIG. 4 depicts a handheld device 401 scanning a label 103 present on a product 102, wherein the handheld device 401 is connected to a computing system 402. The label 103 may be an alphanumeric data based label, a machine-readable data based label or a RFID based label. The handheld device 401 may be any suitable device capable of reading the label 103. Examples of the handheld device 401 may be a mobile phone, a PDA, a tablet, a handheld scanner or a dedicated scanning device. The handheld device 401 may comprise of more than one type of scanner, wherein the scanner used for reading a particular label depends on the type of label being scanned. The handheld device 401 comprises an application, wherein the application performs the functions as detailed herein. The handheld device 401 may be brought by the consumer into the retail location. In certain embodiments, the handheld device 401 may be provided to the consumer by the retailer for use at the retail location. The handheld device 401 may be connected to the computing system 402 using a suitable wireless communication link, such as a Wi-Fi network, a cellular communication network, a short range communication network (such as Bluetooth, Zigbee and so on). The computing system 402 may comprise of at least one computing system, which may comprise of a server, a desktop computer, a portable computer, a dedicated device and so on.

Consider an example, where the label 103 is an alphanumeric data based label, the handheld device 401 comprises a camera to capture to data printed on the label 103. In a second example, the handheld device 401 comprises of a scanner (such as a camera, laser scanner and so on) which the consumer uses to scan the label containing a machine-readable code (such as a barcode, QR code and so on). In a third example, the handheld device 401 uses a RFID reader to read the RFID label 103 present on the product 102.

The handheld device 401 may scan the label, on an app within the handheld device 401 being initiated. The app may be an application present on the phone, wherein the app may be initiated by the consumer using a suitable interface.

In an embodiment herein, the app on the handheld device 401 scans the label 103 and sends the scanned label to the computing system 402. The computing system 402 compares the scanned label with at least one other label, wherein the other labels may be scanned at a later point by the handheld device 401.

In another embodiment herein, the app on the handheld device 401 scans the label 103 and sends the scanned label to the computing system 402. The computing system 402 compares the scanned label with at least one other label, wherein the other labels may be stored in a memory associated with the handheld device 401.

In another embodiment herein, the computing system 402 compares the scanned label with at least one other label, wherein at least one of the other labels may be stored in a memory associated with the computing system 402 or the handheld device 401 and other labels may be scanned at a later point by the handheld device 401.

The computing system 402 extracts the required information from the labels. The extracted information may comprise of cost of the product, weight of the product and so on. The units of the weight of the product may be as per the standards followed. The computing system 402 computes the cost per unit weight for each of the products to whom the label belongs. The computing system 402 further compares the cost per unit weight for all of the products to whom the label belongs and determines the cheapest product (wherein the cheapest product is the product with lowest cost per unit weight). In another embodiment herein, the computing system 402 may provide labels, which may have been stored by other consumers to the current consumer for comparison.

The computing system 402 sends the information to the handheld device 401. The information may comprise of the cheapest product, the cost per unit weight of the cheapest product, a list of all the products, which have been compared, and corresponding costs per unit weight of the products. The handheld device 401 may further display the cheapest product to the consumer. In certain embodiments herein, the handheld device 401 may display a list comprising of all compared products, wherein the list may be arranged in ascending order from the cheapest product to the most expensive product. The consumer may also be offered the option of re-ordering the list, as per his preferences.

The app may further display the location of the cheapest product within the retail store. The app may display the location in the form of a map stating the aisle/section where the product is located and the exact location of the product within the aisle/section. The display may be in the form of a map of the layout of the retail store, which may be a two dimensional map or a three dimensional map. The app may fetch the information to be displayed from a memory store within the handheld device 101. In another embodiment herein, the app may fetch the information to be displayed from an external source. The external source may be at least one of a server belonging to the retail store, an external database and so on.

Further, the app may provide directions to enable the consumer to reach the location of the product from the current location of the consumer. The current location of the consumer may be inside the retail store or outside the retail store. The directions may be provided as a real time navigation model, where the app displays a map in the form of a line-based directions using arrows to indicate the direction the consumer has to move, from the current location of the consumer to the location of the product. The directions may be updated in a continuous manner, based on the current location and direction of movement of the consumer. In an embodiment herein, the app comprises of an audio guide for providing directions to the consumer. The audio guide may provide instructions such as "proceed straight for 10 meters", "take a right after 5 meters", "the product is located 10 steps on the middle shelf to your right" and so on. The app may also provide options for the consumer to select, such as the shortest route, the route that has the least crowds present and so on.

In another embodiment herein, the app may display the locations of all the products, which are displayed in a list form to the consumer. The products may be tagged with labels such as A, B and so on, with the locations where the corresponding products are located may be tagged with the corresponding labels. The app enables the consumer to select one or more products, with the consumer being displayed the locations of the products within the retail store. In an embodiment herein, the products may be located in various retail stores. The app may further provide directions to the consumer to navigate from one product to another. The app may also provide options for the consumer to select, such as the shortest route between the products, the route, which has the least crowds, present and so on.

In another embodiment herein, the app may offer the user of filtering the products, where the filtration criteria may comprise of at least one of brand of the product, a range of weights, location of the product and so on.

Figure 5:
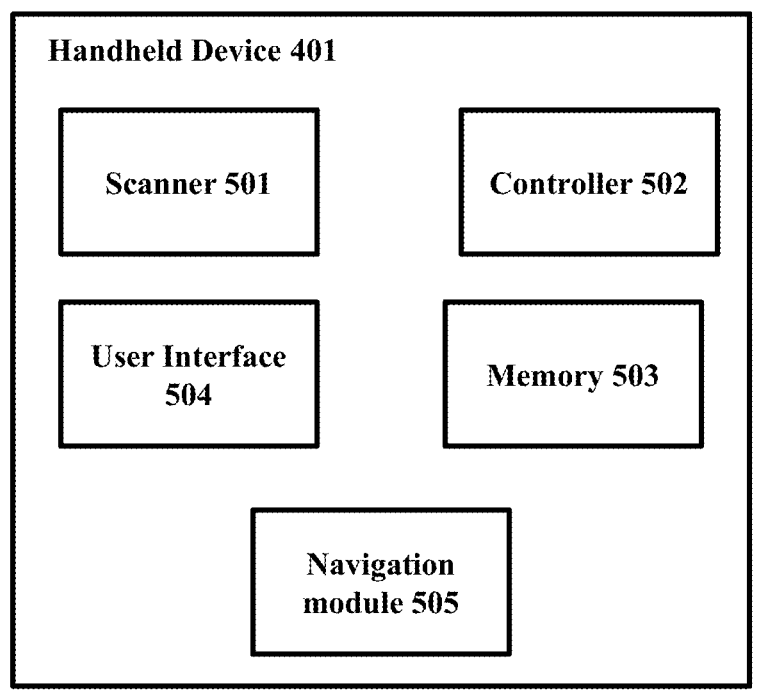
FIG. 5 is a schematic block diagram of a handheld device, according to embodiments as disclosed herein.

Referring to FIG. 5, which depicts a handheld device, according to embodiments as disclosed herein. The handheld device 401, as depicted, comprises of a scanner 501, a controller 502, a memory 503, a user interface 504 and a navigation module 505, in accordance with the present invention.

The scanner 501 may comprise of at least one type of scanning means. The scanning means may be a camera incorporated into the device, a RFID reader, a barcode reader (such as a laser scanner) and so on.

The controller 502 may be an app residing on the handheld device 401, wherein the controller 502 may be invoked by the consumer using the user interface 504. The user interface 501 may be at least one of a visual display (such as a display screen and so on), a touch based input means (such as a keyboard, a touch screen interface and so on), an audio means (such as a speaker and so on) and so on. The controller 502, on being invoked, performs a check for the type of label 103 to be scanned. In certain embodiments herein, the check for the type of label 103 to be scanned may be done using a camera present on the handheld device 401, wherein the consumer may be asked to point the camera at the label 103. In other embodiments herein, the controller 502 asks the consumer to input the type of label 103 to be scanned, wherein the consumer may be asked using the user interface 504. The consumer may be asked to select from a list of labels, which are supported by the handheld device 401. In an alternative, the consumer may be asked to enter the type of label 103 to be scanned, wherein an auto-completion or suggestion feature may be incorporated. Based on the type of the label 103, the controller 502 invokes the specific scanner required to scan the label 103. If more than one type of scanner may be used to scan the label 103, the controller 502 may check for user preferences for the scanner to be used. the controller 502 may also check based on the past scanning history, as to which scanner has been used more frequently and which scanner gives better results, in terms of better clarity of scans, time required for scanning and so on. Consider an example, where a barcode on a label has to be scanned. The barcode may be scanned using a camera (as done in mobile devices) or by a dedicated laser scanner (as done at the checkout counters at retail outlets), both of which are present in the handheld device 401. The controller 502 selects the laser scanner, as the consumer has indicated that he wants to scan the label 103 using the laser scanner.

The controller 502 invokes the required scanner 501. The consumer may be asked to point the scanning device in the direction of the label 103, using the user interface 504. The consumer may be given directions as to the proper manner in which the handheld device 401 has to be oriented. On detecting that the handheld device 401 has been oriented in the proper direction, the scanner 501 scans the label 103. The handheld device 401 may use a suitable means such as a combination of a camera, an accelerometer and so on to detect the current orientation of the handheld device 401.

On receiving the scanned label, the controller 502 checks if the consumer wants to scan another label using the user interface 504, before proceeding with sending the scanned label to the computing system 402.

If the consumer wants to scan another label, then the consumer selects the appropriate selection using the user interface 504. On receiving the input from the consumer, the controller 502 performs the steps as disclosed above to scan a second label.

If the consumer does not want to scan another label, the controller 502 may ask the consumer to select at least one label for comparison using the user interface 504, as per instructions received from the computing system 402. The user interface 504 may offer a list of scanned labels, wherein the consumer may select two or more labels from the list for the comparison. At least one of the labels may have been scanned by the handheld device 401 in real time. In certain embodiments, at least one of the labels may be retrieved from the memory 503.

The controller 502 may further display the cheapest product to the consumer using the user interface 504, on receiving the information from the computing system 402. In certain embodiments herein, the user interface 504 may display a list comprising of all compared products, wherein the controller 502 may arrange the list in ascending order from the cheapest product to the most expensive product. The user interface 504 may also offer the option of re-ordering the list to the consumer, as per his preferences.

Further, the controller 502 may provide directions to enable the consumer to reach the location of the product from the current location of the consumer with the assistance of the navigation module 505. The navigation module 505 may use at least one of Global Positioning System (GPS), a wireless network (where the wireless network uses one of a cellular network, a Wi-Fi network, a Bluetooth network or any other suitable network) for detecting the current location of the consumer. The navigation module 505 estimates the directions for the consumer to reach the cheapest product. The navigation module 505 may provide the directions as a real time navigation model, where the user interface 504 displays a map in the form of a line based directions using arrows to indicate the direction the consumer has to move, from the current location of the consumer to the location of the product. The navigation module 505 keeps track of the movement of the consumer (in terms of the current location and direction of movement of the consumer) and updates the directions in a continuous manner. In an embodiment herein, the navigation module 505 further uses an audio guide for providing directions to the consumer. The audio guide may provide instructions such as "proceed straight for 10 meters", "take a right after 5 meters", "the product is located 10 steps on the middle shelf to your right" and so on. The navigation module 505 may also provide options for the consumer to select, such as the shortest route, the route that has the least crowds present and so on.

In another embodiment herein, the controller 502 may display the locations of all the products on the user interface 504, which are displayed in a list form to the consumer. The controller 502 may tag the products with labels such as A, B and so on, with the locations in the map, where the corresponding products are located are tagged with the corresponding labels. The controller 502 enables the consumer to select one or more products, with the consumer being displayed the locations of the products within the retail store. In an embodiment herein, the products may be located in various retail stores. The navigation module 505 may further provide directions to the consumer to navigate from one product to another. The navigation module 505 may also provide options for the consumer to select, such as the shortest route between the products, the route, which has the least crowds, present and so on.

In another embodiment herein, the comparator 502 may offer the user of filtering the products, where the filtration criteria may comprise of at least one of brand of the product, a range of weights, location of the product and so on.

Figure 6:
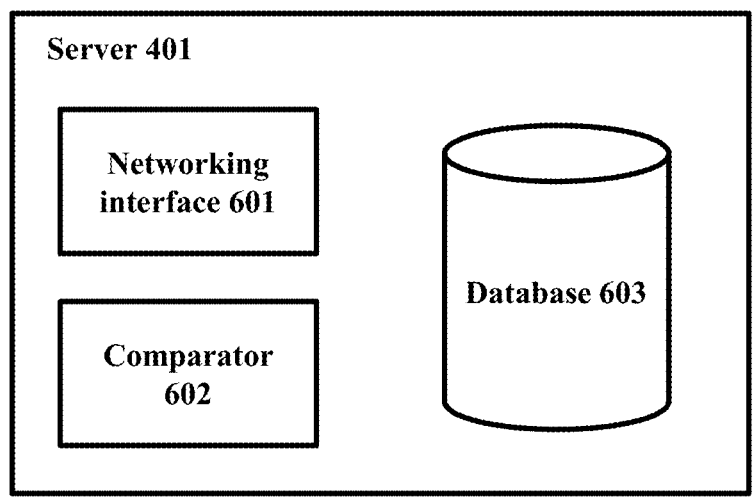
FIG. 6 is a schematic block diagram of a computing system, according to embodiments as disclosed herein.

Referring to FIG. 6, which depicts a computing system, according to embodiments as disclosed herein. The computing system 402, as depicted, comprises of a networking interface 601, a comparator 602 and a database 603, in accordance with the present invention.

The networking interface 601 serves as the communication interface between the computing system 402 and handheld device 401. The networking interface 601 may be a wireless communication interface using at least one of Wi-Fi, cellular networks for communications.

The comparator 602 may be an app residing on the computing system 402, wherein the comparator 602 may be invoked by the computing system receiving a scanned label 103.

On receiving the scanned label, the comparator 602 checks if the consumer wants to scan another label using the user interface 204, before proceeding with the comparison. The comparator 602 may store the scanned label in the database 503 (wherein the database 503 may comprise of one or more memory modules). In certain embodiments herein, the memory 201 may be present external to the computing system 402, wherein the computing system 402 communicates with the database 503 using a suitable network communication means such as a wired or wireless connection means.

If the consumer does not want to scan another label, the comparator 602 may ask the consumer to select at least one label for comparison using the user interface 502. The user interface 502 may offer a list of scanned labels, wherein the consumer may select two or more labels from the list for the comparison. At least one of the labels may have been scanned by the handheld device 401 in real time. In certain embodiments, at least one of the labels may be retrieved from the database 503. In other embodiments herein, at least one of the labels may be stored by another consumer in the database 503 and made available for access by other consumers.

The comparator 602 extracts the required information from the selected labels. The extracted information may comprise of cost of the product, weight of the product and so on. The comparator 602 computes the cost per unit weight for each of the products to whom the label belongs. The comparator 602 further compares the cost per unit weight for all of the products to whom the label belongs and determines the cheapest product (wherein the cheapest product is the product with lowest cost per unit weight).

In an embodiment herein, the comparator 602 may standardize the unit weights, in case the weights are mentioned in different units.

The comparator 602 sends the information to the handheld device 401 using the networking interface 501. The information may comprise of the cheapest product, the cost per unit weight of the cheapest product, a list of all the products, which have been compared, and corresponding costs per unit weight of the products.

Figure 7:
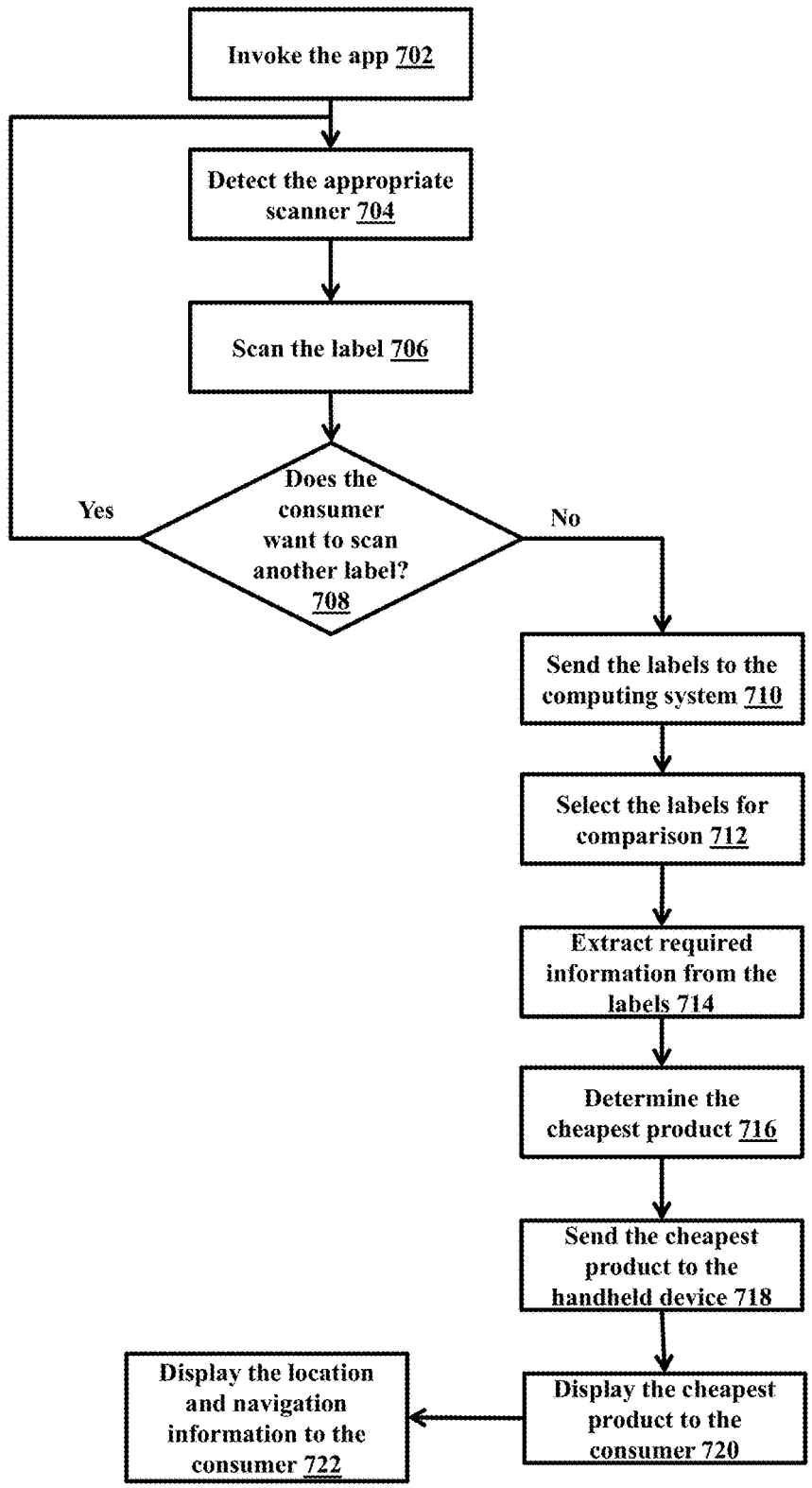
FIG. 7 is a flowchart depicting the process of determining the cheapest product per unit weight and locating the product within the retail store, according to embodiments as disclosed herein.

FIG. 7 is a flowchart depicting the process of determining the cheapest product per unit weight and locating the product within the retail store, according to embodiments as disclosed herein. The consumer invokes 702 the app residing on the handheld device 401, wherein the app may be invoked by the consumer. The app, on being invoked, determines 704 the type of label 103 to be scanned. In certain embodiments herein, the check for the type of label 103 to be scanned may be done using a camera present on the handheld device 401, wherein the consumer may be asked to point the camera at the label 103. In other embodiments herein, the app asks the consumer to input the type of label 103 to be scanned. The consumer may be asked to select from a list of labels, which are supported by the handheld device 401. In an alternative, the consumer may be asked to enter the type of label 103 to be scanned, wherein an auto-completion or suggestion feature may be incorporated. If more than one type of scanner may be used to scan the label 103, the app may check for user preferences for the scanner to be used. The app may also check based on the past scanning history, as to which scanner has been used more frequently and which scanner gives better results, in terms of better clarity of scans, time required for scanning and so on. Based on the type of label, the app scans 706 the label 103. The app may ask the consumer to point the scanning device in the direction of the label 103. The consumer may be given directions as to the proper manner in which the handheld device 401 has to be oriented. The handheld device 401 may use a suitable means such as a combination of a camera, an accelerometer and so on to detect the current orientation of the handheld device 401. On receiving the scanned label, the app checks 708 if the consumer wants to scan another label. The app may store the scanned label. If the consumer wants to scan another label, then the app performs the steps as disclosed above to scan a second label. If the consumer does not want to scan another label, the app sends 710 the labels to the computing system 402, where the computing system 402 selects 712 a plurality of labels for comparison by asking the consumer for the same. The app may offer a list of scanned labels, wherein the consumer may select two or more labels from the list for the comparison. At least one of the labels may have been scanned by the handheld device 401 in real time. In certain embodiments, at least one of the labels may be retrieved from the database. The app extracts 714 the required information from the selected labels. The extracted information may comprise of cost of the product, weight of the product and so on. The computing system 402 determines 716 the cheapest product (wherein the cheapest product is the product with lowest cost per unit weight) by computing the cost per unit weight for each of the products to whom the label belongs and comparing the cost per unit weight for all of the products to whom the label belongs and determines the cheapest product. The computing system 402 sends 718 the required information to the handheld device 401, where the app displays 720 the cheapest product to the consumer. In certain embodiments herein, the app may display a list comprising of all compared products, wherein the app may arrange the list in ascending order from the cheapest product to the most expensive product. The app may also offer the option of re-ordering the list to the consumer, as per his preferences. The app may further display 722 the location of the cheapest product within the retail store. The app may display the location in the form of a map stating the aisle/section where the product is located and the exact location of the product within the aisle/section. The display may be in the form of a map of the layout of the retail store, which may be a two dimensional map or a three dimensional map. Further, the app may provide directions to enable the consumer to reach the location of the product from the current location of the consumer. The directions may be provided as a real time navigation model, where the app displays a map in the form of a line-based directions using arrows to indicate the direction the consumer has to move, from the current location of the consumer to the location of the product. The directions may be updated in a continuous manner, based on the current location and direction of movement of the consumer. In an embodiment herein, the app comprises of an audio guide for providing directions to the consumer.

Figure 8:
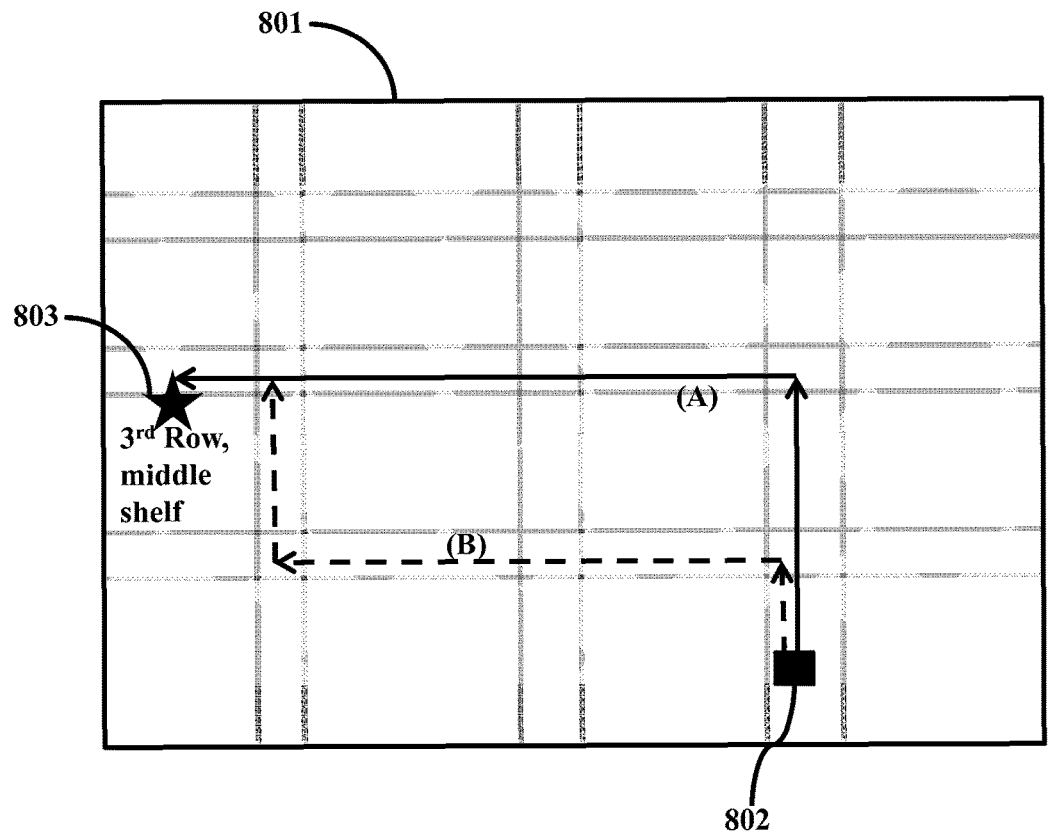
FIG. 8 illustrates a screenshot on the display of a handheld device depicting the location of the cheapest product within a retail store, according to embodiments as disclosed herein.

FIG. 8 illustrates a screenshot 801 on the display of a handheld device depicting the location of the cheapest product within a retail store, according to embodiments as disclosed herein. The handheld device 101 displays the location 803 of the cheapest product within the retail store using a two dimensional map. The handheld device 101 displays the location in the form of a map stating that the product is available in the third row, middle shelf of aisle 2. Further, the handheld device 101 provides the shortest route (depicted as A) from the current location of the consumer 802 to the location of the product 803. The directions are provided in the form of a line-based directions using arrows to indicate the direction the consumer has to move, from the current location of the consumer to the location of the product. An alternate route (B) is also depicted, which is the least crowded route to reach the product.

The flowchart and block diagrams in the FIGS. 1, 2, 3, 4, 5, 6 and 7 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for locating, by a multipurpose mobile device having a plurality of scanners each having a different scanner type, a controller, a navigation module, and a processor, a cheapest product per unit weight in a retail store, the method comprising:
　　repeatedly determining by the navigation module of the mobile device, an indoor location of a user within the retail store;
　　identifying a label type for each label of a plurality of labels, wherein each label type is one of a plurality of different label types:
　　automatically selecting a scanner of the plurality of scanners having a scanner type that corresponds to the identified label type, wherein the automatic selection of the scanner is based on data stored within a digital memory of the mobile device:

scanning each label of the plurality of labels using the selected scanner of the mobile device:

extracting, by the scanner of the mobile device, information related to a price of a product and a weight of the product embedded within the plurality of labels, wherein the plurality of labels provide information about products located in disparate locations within the retail store to be compared;

electronically uploading, by the controller of the mobile device, information from the plurality of labels related to the price of the product and the weight of the product to the digital memory of the mobile device to be processed by the processor of the mobile device;

automatically determining, by a comparator of the mobile device in the form of an application stored in the digital memory of the mobile device, the cheapest product per unit weight from the products to be compared based on the extracted information by processing, by the processor of the mobile device, the application stored in the digital memory of the mobile device and executed by the processor of the mobile device to automatically compare a price per unit weight of one or more products to the information extracted from the plurality of labels;

determining, with the navigation module, locations of the products associated with each of the plurality of labels relative to the indoor location of the user by executing, with the processor of the mobile device, software code configured to determine the locations of the products associated with pricing information associated with related products relative to the indoor location of the user within the retail store;

presenting each compared product of the products in a list that is ordered according to the cheapest product per unit weight:

providing, by the processor of the mobile device, a location of the cheapest product per unit weight in the retail store relative to the indoor location of the user;

rendering a graphic mapping representation of location information of the products associated with the plurality of labels relative to the user;

providing, by the processor of the mobile device, turn by turn directions according to aisles and a shelf identification from the indoor location of the user to a desired product location within the graphic mapping representation of directions showing detailed location information and turn by turn walking directions from the indoor location of the user to the compared products of the products being considered by the user that are viewable by the user on the mobile device; and continuously updating the graphic mapping representation of the turn by turn directions based on the indoor location of the user.

2. The method of claim 1, wherein the method further comprises providing navigational information to the user using a GPS module to generate turn by turn directions to the user from the indoor location of the user to a desired product in the retail store.

3. The method of claim 2, wherein the method further comprises displaying the indoor location of the user on a map of a layout of the retail store and icons superimposed on the map that indicate the locations of desired products of the products.

4. The method of claim 2, wherein the method further comprises using the GPS module for providing the locations of at least two of the products to be compared and turn by turn directions from the indoor location of the user to each of the at least two of the products.

5. The method of claim 4, wherein the method further comprises providing navigational information between the at least two of the products to be compared and turn by turn directions from one product location to another product location.

6. A method for locating, by a mobile device having a plurality of scanners each having a different scanner type, a controller, a navigation module, and a processor, a cheapest product per unit weight in a retail store, the method comprising:

repeatedly determining, by the navigation module of the mobile device, a global location of a user within the retail store;

identifying a label type for each label of a plurality of labels, wherein each label type is one of a plurality of different label types;

automatically selecting a scanner of the plurality of scanners having a scanner type that corresponds to the identified label type;

upon a selection of the scanner having the scanner type corresponding to an RFID scanner, scanning each label of the plurality of labels using an electronic RFID module of the mobile device, wherein each scanned label of the plurality of labels is one of a plurality of electronic RFID labels;

extracting, using the electronic RFID module of the mobile device, information related to a price of a product and a weight of the product embedded within the plurality of electronic RFID labels to be compared, the plurality of electronic RFID labels providing information about products located in disparate locations within the retail store, electronically uploading, by the controller of the mobile device, information from the plurality of electronic RFID labels related to the price of the product and the weight of the product to a digital memory of the mobile device to be processed by the processor of the mobile device;

automatically determining, by a comparator of the mobile device in the form of an application stored in the digital memory of the mobile device, the cheapest product per unit weight from the products to be compared based on the extracted information by processing, by the processor of the mobile device, the application stored in the digital memory of the mobile device and executed by the processor of the mobile device to automatically compare a price per unit weight of one or more products to the information extracted from the plurality of electronic RFID labels;

determining, with the navigation module, locations of the products associated with each of the plurality of electronic RFID labels relative to the global location of the user by executing, with the processor of the mobile device, software code configured to determine the locations relative to the user of the products associated with information associated with related products;

providing, by the processor of the mobile device, a location of the cheapest product per unit weight according to aisles and a shelf identification in the retail store relative to the user;

rendering a graphic representation of location information of the products associated with the plurality of electronic RFID labels and showing detailed location information and turn by turn walking directions from the global location of the user to compared products of the products being considered by the user;

providing, by the processor, turn by turn directions from the global location of the user to a desired product location with a graphic display of directions that is viewable by the user on the mobile device; and continuously updating the graphic representation of the turn by turn directions based on the global location of the user.

7. A mobile device comprising:

a plurality of scanners each having a different scanner type;

a controller;

a digital memory;

a navigation module; and a processor, wherein the mobile device is configured to:

repeatedly determine, by the navigation module, an indoor location of a user within a retail store;

identify a label type for each label of a plurality of labels, wherein each label type is one of a plurality of different label types;

automatically select a scanner of the plurality of scanners having a scanner type that corresponds to the identified label type;

scan each label of the plurality of labels using the selected scanner of the mobile device;

extract, by the scanner, information related to a price of a product and a weight of the product embedded within the plurality of labels, wherein the plurality of labels provide information about products located in disparate locations within the retail store to be compared;

electronically upload, by the controller, information from the plurality of labels related to the price of the product and the weight of the product to the digital memory to be processed by the processor;

determine, by a comparator in the form of an application stored in the digital memory, a cheapest product per unit weight from the products to be compared based on the extracted information by processing, by the processor, the application stored in the digital memory and executed by the processor to automatically compare a price per unit weight of one or more products to the information extracted from the plurality of labels;

determine, with the navigation module, locations of the products associated with each of the plurality of labels relative to the indoor location of the user by executing, with the processor, software code configured to determine the locations of the products associated with pricing information associated with related products relative to the indoor location of the user within the retail store;

provide, by the processor, a location of the cheapest product per unit weight in the retail store relative to the indoor location of the user;

render a graphic mapping representation of location information of the products associated with the plurality of labels relative to the user;

provide, by the processor, turn by turn directions according to aisles and a shelf identification from the indoor location of the user to a desired product location within the graphic mapping representation of directions showing detailed location information and turn by turn walking directions from the indoor location of the user to compared products of the products being considered by the user that are viewable by the user on the mobile device; and continuously update the graphic mapping representation of the turn by turn directions based on the indoor location of the user.

8. The mobile device of claim 7, wherein the mobile device is further configured to provide navigational information to the user using a GPS module to generate turn by turn directions to the user from the indoor location of the user to a desired product in the retail store.

9. The mobile device of claim 8, wherein the mobile device is further configured to display the indoor location of the user on a map of a layout of the retail store and icons superimposed on the map that indicate the locations of desired products of the products.

10. The mobile device of claim 8, wherein the mobile device is further configured to use the GPS module to provide the locations of at least two of the products to be compared and turn by turn directions from the indoor location of the user to each of the at least two of the products.

11. The mobile device of claim 10, wherein the mobile device is further configured to provide navigational information between the at least two of the products to be compared and turn by turn directions from one product location to another product location.

* * * * *